US006854735B2

United States Patent
Sarshar et al.

(10) Patent No.: US 6,854,735 B2
(45) Date of Patent: Feb. 15, 2005

(54) IN SITU LOAD SHARING BRUSH SEALS

(75) Inventors: Hamid Reza Sarshar, Clifton Park, NY (US); Norman Arnold Turnquist, Sloansville, NY (US); Osman Saim Dinc, Troy, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/227,643

(22) Filed: Aug. 26, 2002

(65) Prior Publication Data

US 2004/0036227 A1 Feb. 26, 2004

(51) Int. Cl.[7] .............................................. F16J 15/44
(52) U.S. Cl. ...................................... 277/355; 277/303
(58) Field of Search ................................. 277/355, 303

(56) References Cited

U.S. PATENT DOCUMENTS

| 5,106,104 | A | * | 4/1992 | Atkinson et al. ............ 277/303 |
| 5,335,920 | A | * | 8/1994 | Tseng et al. ................ 277/303 |
| 5,480,165 | A | * | 1/1996 | Flower ....................... 277/355 |
| 5,568,931 | A | * | 10/1996 | Tseng et al. ................ 277/355 |
| 5,630,590 | A | * | 5/1997 | Bouchard et al. ........... 277/301 |
| 5,758,879 | A |   | 6/1998 | Flower |
| 5,794,942 | A | * | 8/1998 | Vance et al. ................ 277/303 |
| 5,961,279 | A | * | 10/1999 | Ingistov .................... 415/170.1 |
| 6,131,910 | A |   | 10/2000 | Bagepalli et al. |
| 6,283,716 | B1 | * | 9/2001 | Centers ........................ 417/18 |
| 6,308,957 | B1 | * | 10/2001 | Wright ....................... 277/355 |
| 6,378,371 | B1 | * | 4/2002 | Aksit et al. .................. 73/579 |
| 6,435,011 | B1 | * | 8/2002 | Dinc et al. .................... 73/52 |

FOREIGN PATENT DOCUMENTS

EP              0816726 A1 *  1/1998

* cited by examiner

Primary Examiner—Alison K. Pickard
(74) Attorney, Agent, or Firm—Ann M. Agosti; Patrick K. Patnode

(57) ABSTRACT

Multistage brush seals are made by initially specifying designs thereof for collectively sharing a differential pressure along an adjacent land subject to relative rotation with the seals. The seals are modified to share the loading without blowdown therefrom. The seals are further modified to ensure rotational stability with the land. The seals are built and tested under pressure to determine pressure blowdown thereof. And then, the seals are again modified to share the pressure loading under blowdown. In this way, the seals share the load in situ under the effects of blowdown.

16 Claims, 2 Drawing Sheets

IN SITU LOAD SHARING BRUSH SEALS

BACKGROUND OF THE INVENTION

The present invention relates generally to rotating seals, and, more specifically, to multistage brush seals.

Various forms of engines or motors include various forms of seals therein specifically configured for separating relatively high and low pressure regions thereof. For example, gas and steam turbine engines have various stages therein in which air, combustion gases, and steam travel downstream with changes of pressure and temperature thereof.

Turbine engines are made as large as practical for maximizing output work and performance efficiency. Large turbines also have correspondingly large pressure drops of the fluid flow therethrough which requires suitable sealing during operation.

In a labyrinth seal, a row of annular seal teeth is disposed closely adjacent to a cooperating land for relative rotation therewith, with a radial clearance therebetween for reducing the likelihood of undesirable rubbing therebetween. Another form of seal typically found in turbine engines is the brush seal in which a pack of bristles is mounted between supporting plates, with the distal ends of the bristles extending freely therefrom for effecting a rotary seal with the adjacent land. The bristles are inclined from the land and may form a small clearance therewith or may be in interference contact therewith.

Brush seals offer the ability to effectively seal the very high pressures in a turbine engine, for example, while maintaining stability during relative rotation with the land and having a suitably long life during operation.

Experience has shown that a single stage brush seal has a practical limit of sealing differential pressure up to about 400 psid, with a suitable safety factor for correspondingly reducing that limit. Over-pressurization of the brush seal will cause excessive leakage, plastic deformation thereof or fatigue failure in short time.

Brush seals may be disposed in series, but again experience has shown that their ability to seal very high differential pressures in excess of 400 psid is again limited to substantially less than twice the 400 psid limit, correspondingly reduced by the safety factor, for each seal in view of the practical variation in load sharing therebetween. And, experience has additionally shown that additional series brush seals in excess of two have no practical capability of sealing increased differential pressure imposed across those multiple stage brush seals.

In two or more stages of identical brush seals, the first stage is capable of sharing a minority of the total pressure load across the brush seal assembly, with the last brush seal carrying a majority of the total pressure loading. Accordingly, the sealing capability of the multistage brush seals is limited by that last stage, and correspondingly limits the maximum differential pressure which the seals may safely carry during operation.

It is known to vary the seal clearances with the adjacent land to vary the load sharing capability of each seal stage. However, the specific value of the seal clearance affects the total sealing capability, with larger clearances decreasing loading capability, while smaller clearances increase loading capability.

However, small clearances subject the bristles to increased friction rubbing with the land during transient operation of the engine, with friction rubbing correspondingly heating the components. In a typical example, the land is defined by the outer perimeter of a rotary shaft, and the brush seals are stationary. Friction rubbing of the bristles with the shaft causes local heating thereof and corresponding thermal expansion which can adversely affect stability of the rotating shaft. As the shaft thermally expands under rubbing, the rubbing friction forces further increase for further increasing friction heating of a shaft. And, the shaft is subject to undesirable instability, such as wobbling, which can require emergency shut down of the entire engine.

The geometric configuration of the bristles also affects the maximum sealing capability thereof. Soft or flexible bristles are subject to increased bending under differential pressure, and hard or stiff bristles increase the friction heating under rubbing with the land. Furthermore, the differential pressure exerted across the pack of bristles effects blowdown therein in which the inclined bristles deflect slightly radially inwardly, which correspondingly increases friction heating during rubbing with the land.

In view of these interrelated operation effects of brush seals, conventionally known multistage brush seals are limited to two brush seals in series, with a current practical limit of 550 psid total differential pressure based on a suitable factor of safety therein. And, the ability to achieve load sharing between the multiple seals stages is limited by bristle rubbing and rotor stability.

Accordingly, it is desired to provide an improved multistage brush seal for increasing the maximum load carrying capability thereof.

BRIEF DESCRIPTION OF THE INVENTION

Multistage brush seals are made by initially specifying designs thereof for collectively sharing a differential pressure along an adjacent land subject to relative rotation with the seals. The seals are modified to share the loading without blowdown therefrom. The seals are further modified to ensure rotational stability with the land. The seals are built and tested under pressure to determine pressure blowdown thereof. And then, the seals are again modified to share the pressure loading under blowdown. In this way, the seals share the load in situ under the effects of blowdown.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
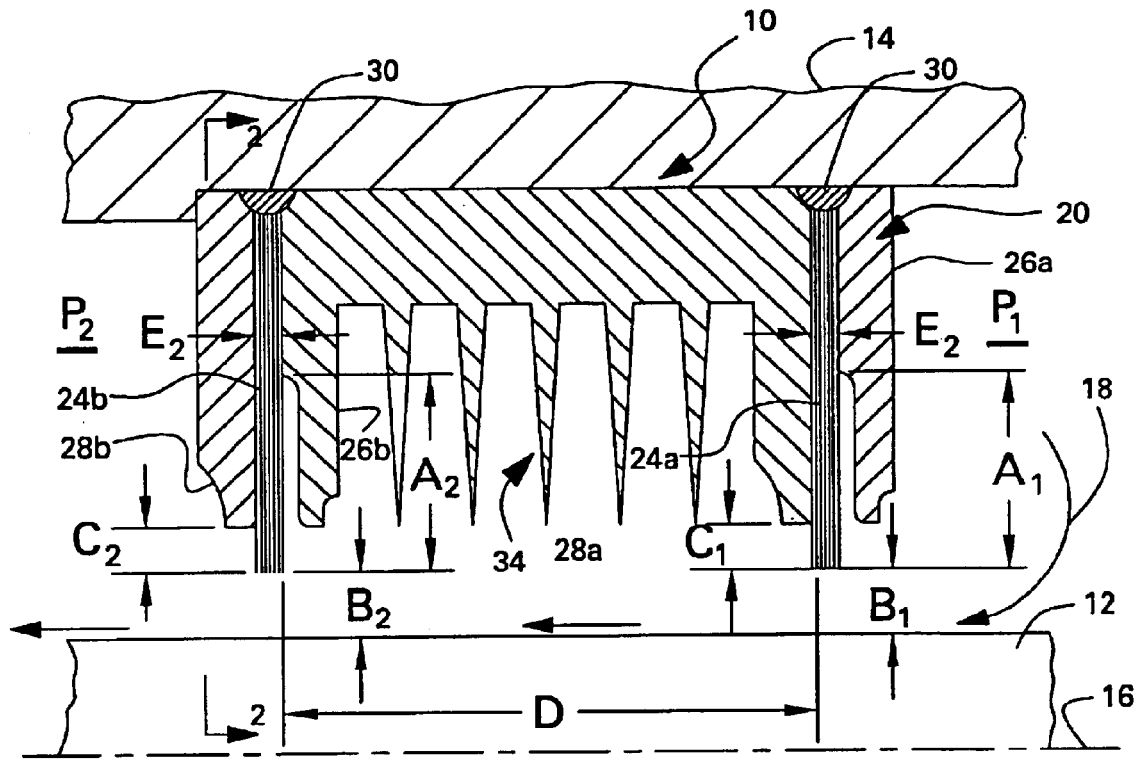
FIG. 1 is a partly sectional axial view through a portion of a multistage brush seal adjacent a cooperating land in accordance with an exemplary embodiment of the present invention.

Illustrated in cross section in FIG. 1 is a multistage annular seal 10 disposed concentrically around an annular land 12 in the exemplary form of a rotor shaft. The seal is suitably mounted in an annular seal support 14 coaxially about an axial or longitudinal centerline axis 16 of the rotor shaft.

The seal is configured in FIG. 1 for use in large industrial gas or steam turbine engines, with the seal being a stationary or stator component surrounding the rotating shaft. Alternatively, the land 12 may be stationary, with the seal being mounted for rotary movement relative thereto.

In either configuration, the seal and land experience relative rotation during operation in the engine, and the seal is configured for sealing differential pressure maintained on opposite axial sides of the seal. For example, a fluid 18, such as steam, is maintained on the right side of the seal at a high pressure P1 and is effectively sealed by the multistage seal for minimizing leakage between the seal and land to the region on the left side of the seal maintained under a lower pressure P2.

The differential pressure, P1–P2, acting across the seal during operation may be relatively high, and greater than about 400 psid for example, and may be substantially higher than about the 550 psid which is the currently known maximum differential pressure capability of conventional brush seals of two or more stages, with a safety factor of two. As indicated above, conventional brush seals do not have the capability for sealing such very high pressures without increased risk of damage to the seals or rotor instability.

The multistage seal illustrated in FIG. 1 includes first and second annular brush seals 20,22 sharing a common design. Each brush seal includes an annular pack or multitude of bristles 24a,b mounted axially between an annular forward support plate 26a,b and an annular aft backing plate 28a,b.

The proximal or base ends of the first and second bristles 24a,b are suitably joined to the corresponding base ends of the respective first and second forward and aft plates by corresponding welds 30 in a conventional manner.

The individual brush seals 20,22 have a common design which is conventional, except as modified in accordance with the present invention as further described hereinbelow. For example, the distal ends of the bristles extend in free length A1,2 from the base ends of the bristles laminated between the mounting plates to extend in cantilever fashion from the distal ends of the corresponding aft plates 28a,b to define corresponding radial clearances B1,2 with the adjacent land 12.

The bristle packs extend past the full radial length of the annular aft plates 28a,b, and extend radially inwardly therefrom in the exemplary embodiment illustrated in FIG. 1. The radially inward extension of the distal ends of the bristles from the corresponding distal ends of the aft plates defines a corresponding fence height C1,2.

Correspondingly, the cooperating forward plates 26a,b have recesses radially outwardly from their radially inner distal ends which provide an axial gap with the bristles for defining the corresponding free lengths A1,2 thereof. In the embodiment illustrated in FIG. 1, the two stages of brush seals are spaced axially apart by an axial spacing D measured between the packs of bristles thereof.

Accordingly, during operation the high pressure fluid 18 is contained at the first forward plate 26a of the first brush seal 20 and is effectively sealed by the first pack of bristles 24a with a correspondingly small radial clearance B1 which permits unobstructed rotation of the shaft therein. However, some of the fluid 18 leaks through the first bristles 24a and first clearance B1 and flows downstream to the second brush seal 22. This lower pressure fluid is then sealed by the second pack of bristles 24b, with the small radial second clearance B2 around the shaft. And, some of this lower pressure fluid leaks through the second bristles 24b and second clearance B2 into the low pressure region maintained near the face of the second aft plate 28b.

Figure 2:
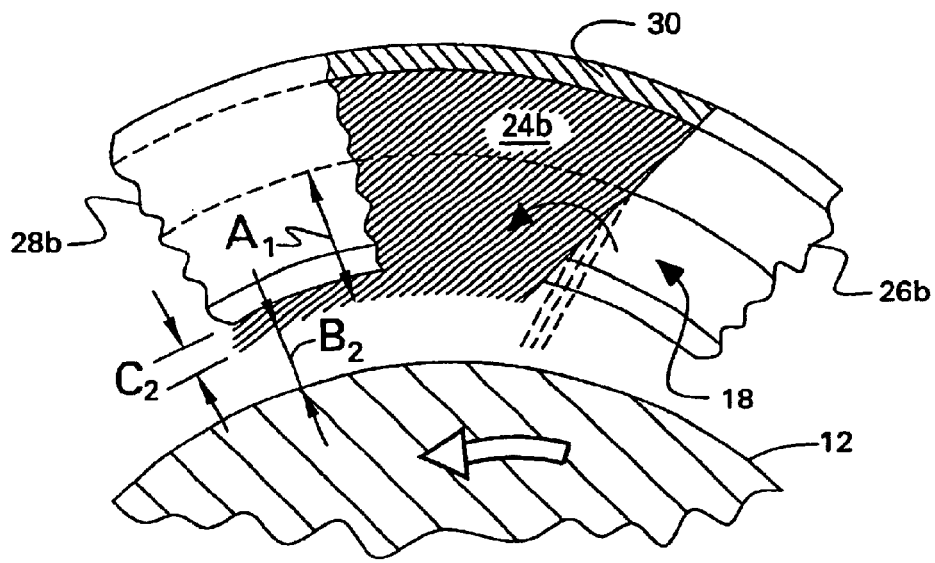
FIG. 2 is a partly sectional radial view of a portion of the multistage seal illustrated in FIG. 1 and taken along line 2—2.

As shown in FIG. 2, the second bristles 24b, as well as the first bristles 24a illustrated in FIG. 1, are tangentially inclined between their corresponding mounting plates at an inclination angle of about 45–60 degrees from the tangential. The direction of rotation of the shaft land 12 is illustrated counterclockwise in FIG. 2, and the bristles are inclined oppositely therefrom so that they may bend or flex radially outwardly under occasional friction rubbing therebetween.

The individual bristles 24a,b may be formed of any conventional material, such as alloy steel, with a relatively small diameter measured in a few mils. The material composition of the bristles, length, diameter, and inclination angle affect the resulting bending stiffness thereof during a rub with the shaft land 12.

As indicated above, the two-stage brush seals 20,22 could be identically configured for sharing the pressure loading from the differential pressure P1–P2, but a conventional configuration thereof is not capable of withstanding high differential pressure exceeding about 550 psid. The bristles in such a conventional design would be relatively stiff and would increase heating of the shaft during rubbing with the bristles and could lead to shaft instability, including wobbling thereof.

However, in accordance with the present invention, the two brush seals 20,22 may be suitably modified for substantially increasing their collective load carrying capability without adversely affecting rotor stability due to occasional bristle-land rubbing.

Figure 3:
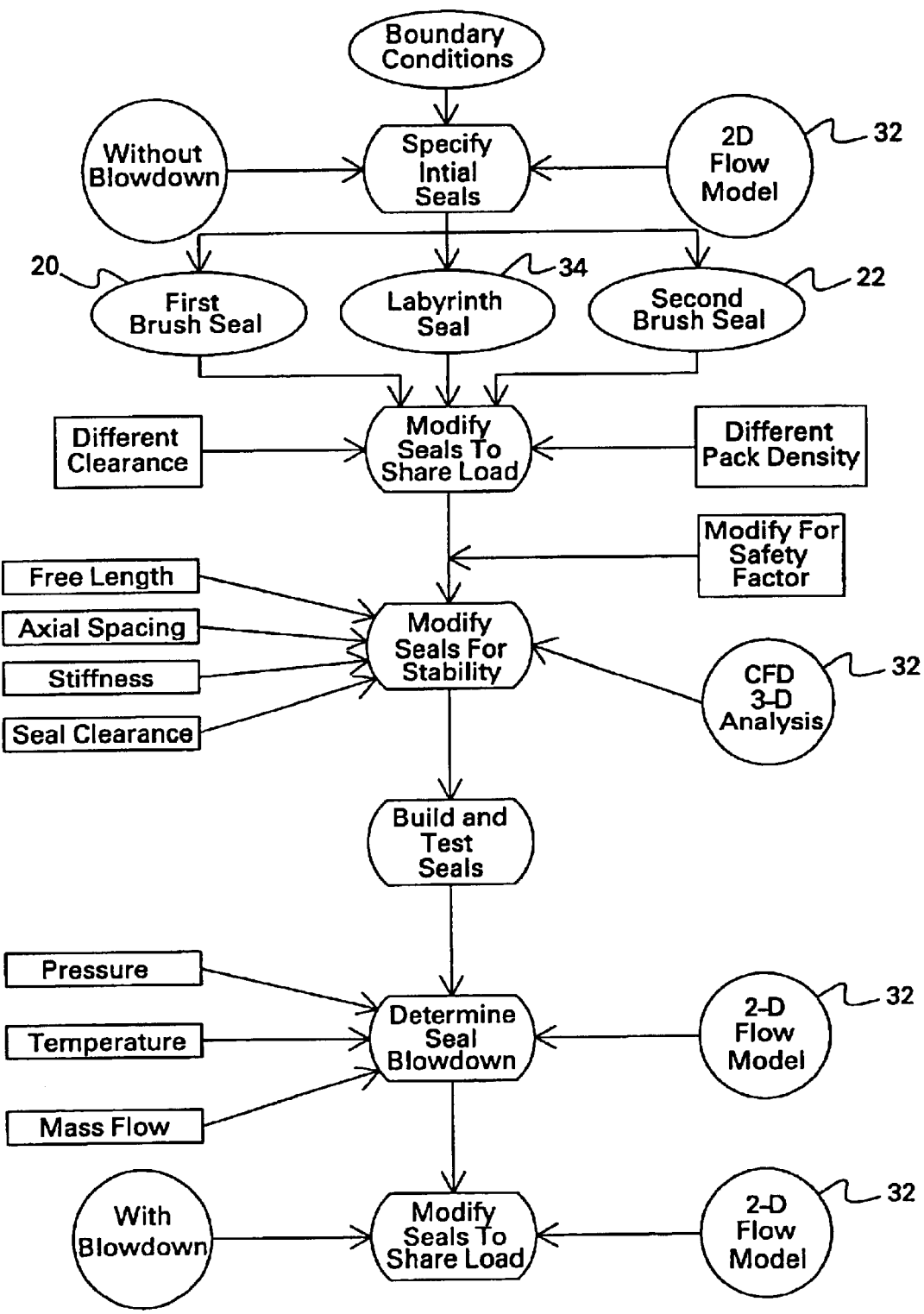
FIG. 3 is a flowchart representation of a method of making the multistage seal illustrated in FIGS. 1 and 2 in accordance with an exemplary embodiment of the present invention.

More specifically, FIG. 3 illustrates in flowchart form an exemplary embodiment of making the multistage seal 10 illustrated in FIGS. 1 and 2 in a configuration having increased load carrying capability while also enjoying rotor stability. The method commences with the conventional boundary or engine conditions which define the environment in which the multistage seal is intended to be used. For example, the boundary conditions include the high and low pressures P1,2, the corresponding differential pressure therebetween, the temperature of the fluid 18, the rotational speed of the shaft, the overall geometry between the shaft 12 and the seal including radial dimensions thereof, and expected differential thermal growth between the stator and rotor components of the seal including startup closures between the bristles and land.

The initial configurations of the two brush seals 20,22 are specified in any conventional manner for maximizing their individual load carrying capability under the expected high pressure loads of operation. The corresponding initial seal designs will therefore have maximum bending stiffness of the inclined bristles for withstanding corresponding maximum pressure loading thereof.

In the exemplary embodiment of the seals illustrated in FIGS. 1 and 2, the bristles are initially designed with a suitable clearance B1,B2 with the rotating land 12 for nominal operation therewith. Since the seal components are subject to differential thermal expansion relative to the shaft, the initially selected seal clearances are cut-back or enlarged for minimizing contact with the rotor land 12 and minimizing corresponding heat generated thereby. It is noted that larger radial clearances decrease sealing performance and also decrease efficiency of the engine.

A two-dimensional (2-D) computational flow model is suitably defined in corresponding software, and analyzed in a conventional digitally programmable computer 32 illustrated schematically in FIG. 3 for determining or setting the radial clearances B1,2 of the two seals for sharing pressure loading therebetween, preferably equally, without consideration of blowdown. At this stage in the process, the design of the multistage seal is conventional and is conducted without consideration of blowdown which would occur in the in situ operation of the seal in its actual environment. The 2-D flow modeling software is conventional, such as Design Flow Solutions which is commercially available from ABZ, Inc., Chantilly, Va.

By adjusting the corresponding radial clearances B1,2, pressure loading may be shared equally between the two seals, but this is an analytical-only prediction of the seal performance without regard to blowdown. In practice, blowdown significantly affects performance of the multistage seal including the load sharing between the discrete brush seals therein.

The multistage seal is only as strong as its weakest seal. The failure of any one of the two brush seals therein will promptly cause the other brush seal to fail; and, therefore, conventional two-stage brush seals are designed with suitable safety factors of operation, and have corresponding limits on pressure loading capability as indicated above.

A suitable safety factor may be conventionally introduced into the design of the multistage seal by setting the corresponding fence heights C1,2 and corresponding thicknesses E1,2, see FIG. 1, of the first and second packs of bristles 24a,b according to the loading predicted by the 2-D model with a suitable safety factor of about two (2) for example.

Blowdown is a significant operational parameter of the seal in its intended environment and is illustrated schematically in FIG. 2. As the pressurized fluid 18 passes between the individual bristles 24a,b of the both packs, the bristles are elastically bent or displaced radially inwardly as shown in phantom line which decreases the effective clearance between the distal ends thereof and the land 12. This radially inward deflection of the bristles under pressure is expressed in a few mils or millimeters in view of its small magnitude and represents the blowdown effect during operation under differential pressure.

Since blowdown affects bristle clearance with the land 12, blowdown also affects rotor stability. Accordingly, conventional computational flow dynamics (CFD) may be used to validate the load sharing distributions predicted in the 2-D model, and additionally provide seal stability parameters associated with operation with the rotating shaft. The CFD analysis is conducted in three dimensions (3-D) in the same or different digitally programmable computer 32. The CFD software is conventional, such as STAR-CD which is commercially available from CD-adapco, Melville, N.Y.

Using the 3-D analysis, the initial design of the two seals may be further modified in order to satisfy suitable stability criteria for ensuring stable operation of the rotor components without unacceptable wobbling, for example. Preferably, the 3-D analysis is used to specify the free length A1,2 of the two bristle packs, the axial spacing D therebetween, and the resulting bending stiffness of the bristles.

The 3-D analysis may also be used for optimizing the free length, axial spacing, and additionally the seal clearances B1,2 to minimize heat generation under land rubbing with the bristles while maintaining suitable stability.

The method of making the multistage seal disclosed above is preferably conducted analytically in sequence to specify suitable designs thereof for sharing load substantially equally therebetween while maintaining rotor stability.

However, in situ operation of the so-designed multistage seal will experience the practical variations in performance which cannot be fully predicted analytically.

Accordingly, the multistage seal so analytically designed is then actually built and tested in suitable size or scale for empirically determining its performance in its intended, or in situ, environment.

In testing of the multistage seal, pressures, temperatures, and mass flows are measured between the high and low pressure sides of the seal to find or determine the blowdown of each seal. The same 2-D flow model disclosed above may be used in a conventional manner to determine the blowdown of each seal based on the measured performance thereof.

The 2-D flow model may then be used again to reset the radial clearances B1,2 for each of the seals to share the pressure loading substantially equally under the effects of the measured blowdown. Engineering judgment or trial and error may be used for increasing or decreasing the respective sizes of the two clearances B1,2 in conjunction with the corresponding measured blowdowns thereof for equally sharing the pressure loading thereacross.

In this way, the multistage seal may be initially analytically designed in a conventional manner without blowdown affects, then optimized for stability of operation in situ, and then built and tested for measuring seal performance and behavior. The empirical data from the testing is then used to determine blowdown under differential pressure, and the seal designs may be further modified for equally sharing the load while using the measured blowdown and achieving stable operation.

This method of making the multistage seal results in two brush seals which may be otherwise identical in design and configuration, except as required for sharing the pressure loading substantially equally in situ while maintaining rotor stability. In this way, the two brush seals may be designed for more accurately sharing the pressure loading equally, which correspondingly increases their collective ability for safely sharing the total differential pressure acting across the multistage seal. Relatively minor, but significant, variation in the geometry of the two brush seals, can achieve a substantial increase in the differential pressure capability thereof, which may be reliably obtained in situ in the intended environment notwithstanding the affects of blowdown.

Furthermore, the method may be further used to introduce three or more stages of brush seals and accurately control the load sharing therebetween including the affects of blowdown at each of the seals. As indicated above, conventional multistage brush seals exceeding two stages enjoy little, if any, increase in load carrying capability for the third or more stages.

A further improvement of the multistage seal disclosed may be obtained by predicting or further testing behavior of the multistage seal and its performance over extended time in the intended environment: Long term operation of seals is subject to performance variation due to wear or other factors which affect performance. Evaluation of seal performance over time may determine changes in engine conditions or blowdown of the individual stages which may be used for further modifying the seal design for maintaining its improved performance over extended time of operation.

A particular advantage of the present invention is that the two brush seals 20,22 may have substantially identical or common designs except for a single design feature thereof having different configurations for sharing the pressure loading with blowdown, with preferably equal load sharing. The method illustrated in FIG. 3 begins with the definition of each brush seal with substantially identical design features and configurations thereof, including size and dimension and material properties. Each brush seal includes its pack of bristles mounted between the corresponding forward and aft plates, with the various geometric dimensions A,B,C and E. And, the two seals are axially spaced apart by the dimension D.

By modifying the initial design of the brush seals in the sequence of process steps described above, the seals are reconfigured for sharing the total pressure loading applied thereacross substantially equally within a suitably small percentage variation, as desired. And, such load sharing is effected in situ in the intended environment under the effect of the applied pressure loading which causes corresponding blowdown in each of the seals.

Two design features of the brush seals described above which affect both seal performance and stability during shaft rubbing are the bristle clearances B1,2 with the land 12 and the packing density of the bristle packs. Packing density is represented by the number of bristles per unit length in the circumferential direction around the perimeter of each brush seal.

The two brush seals may be substantially identical in design and configuration except for a single design feature thereof in the preferred embodiment which has different configurations for the different brush seals determined in accordance with the method disclosed above for preferably equally sharing the pressure loading in the two brush seals under the effect of blowdown.

In one embodiment of the brush seals illustrated in FIGS. 1 and 2 produced by the method illustrated in FIG. 3, the seals may be identical in configuration except for the respective clearances B1,2 between the distal ends of the bristles and the adjacent land 12. In the initial design of the brush seals, the two clearances may be equal, but are modified in accordance with the method disclosed above for achieving the even load sharing therebetween under blowdown conditions, and with stability of operation during rubbing with the shaft 12.

The particular values of the respective clearances will vary from design-to-design based on the boundary conditions of operation and the basic geometry of the seals and cooperating land. However, since two-stage conventional brush seals typically share the overall loading unevenly with more loading being carried by the downstream seal than the upstream seal, the clearance B2 of the downstream second brush seal 22 illustrated in FIG. 1 is preferably greater than the clearance B1 of the upstream first brush seal 20 for achieving the desired even load sharing under blowdown subject to the very high pressure loadings intended. Correspondingly, the two brush seal designs may otherwise be identical, including identical packing densities of the bristles thereof.

In another embodiment represented in FIG. 3, the respective packing densities of the two brush seals may be the single or common design feature which is different in the two seals for effecting the even load sharing under blowdown, with rotor stability. In this embodiment, the respective clearances B1,2 of the two brush seals may be equal to each other, for example zero, for providing an interference or contact fit between the ends of the bristles and the shaft. Although the bristles contact and therefore rub with the rotating land 12 during operation, the bristles are still subject to blowdown which increases the friction forces against the land and affects stability due to friction heating of the land.

Nevertheless, the method disclosed in FIG. 3 may be followed for the different design features, such as clearance or packing density, to determine the required values thereof for sharing the pressure loading with blowdown between the two brush seals. Since the packing density affects leakage of the fluid flow between the bristles, it, like bristle end clearance, may be tailored or optimized in accordance with the method disclosed above for adjusting the respective amounts of loads carried by the two brush seals for achieving the intended even distribution thereof under blowdown.

Another advantage of the method illustrated in FIG. 3 is that the multistage seal 10 illustrated in FIG. 1 may include two or more brush seals in series, with or without additional sealing capability such as the labyrinth seal 34 illustrated therein for example. Labyrinth seals are defined by a series of axially spaced apart annular teeth having corresponding end clearances with the rotating land 12.

The labyrinth seal 34 illustrated in FIG. 1 extends from a common annular flange integrally formed with the base ends of the first aft plate 28a and the second forward plate 26b as illustrated. In this way, three stages of seals are provided for collectively sharing the total differential pressure loading between the axially opposite ends of the multistage seal.

The labyrinth seal 34 itself may be designed and configured in accordance with conventional practice for sharing some of the total pressure loading, with the remaining pressure loading being evenly shared between the two brush seals 20,22 configured in accordance with the method illustrated in FIG. 3. A portion of the total pressure loading may be shared substantially equally between the first and second brush seals 20,22 with their respective loading being different than the pressure loading of the labyrinth seal in view of the different designs thereof. In view of the enhanced sealing capability of brush seals, the two brush seals illustrated in FIG. 1 will collectively carry a substantial majority of the total pressure loading across the entire multistage seal.

By introducing in the design method illustrated in FIG. 3 the affects of blowdown determined by testing, and the effects of rotor stability, the brush seals are more accurately designed for use in their intended environment. Accordingly, when the brush seals are introduced in situ in their intended environment and under the intended pressure loading thereacross, the load sharing thereof can be substantially equal or even for maximizing the load carrying capability of each seal and therefore ensuring the effectiveness and service life of the assembly thereof.

In this way, any conventional brush seal, and in particular brush seals designed for very high pressure capability, may be modified in accordance with the method disclosed above for use in series with even load distribution therebetween. The design method ensures that one brush seal is not overloaded and the other brush seal is not underloaded, and the collective seal arrangement can therefore carry more total pressure loading than previously possible. And, more than two brush seals may be designed in accordance with the method disclosed above for further increasing the total load carrying capability of the multistage seal assembly for further increasing the total pressure load capability of the seal, not previously before possible.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method of making a multistage seal comprising:

specifying initial first and second brush seals having common designs for collectively sealing a differential pressure along a land subject to relative rotation with said seals;

modifying a common design feature of said seals to share loading from said differential pressure without blowdown therefrom;

modifying said seals to ensure rotational stability with said land;

determining pressure blowdown of said seals under pressure, and using information obtained from determining pressure blowdown of said seals under pressure for modifying said common design feature of said seals to substantially equally share said pressure loading under said blowdown.

2. A multistage seal made by the method of claim 1 having substantially identical designs of said first and second seals except for a single design feature having different configurations in said seals for substantially equally sharing said pressure loading under blowdown in said seals.

3. A method according to claim 1 wherein:

said first and second seals are initially specified with said common design including a pack of bristles mounted axially between a forward plate and an aft plate, with distal ends of said bristles extending in free length therefrom; and said bristles are modified in free length and stiffness to minimize heat generation upon rubbing with said land to ensure said rotational stability with said land.

4. A method according to claim 3 wherein:

determining pressure blowdown comprises testing said seals to measure pressures, temperatures, and mass flows of fluid driven thereacross by said differential pressure; and said measured pressures, temperatures, and mass flows are analyzed to determine said blowdown for each of said seals.

5. A method according to claim 4 wherein said first and second seals have a common design except for a single design feature consisting of clearance between said bristle ends and said land, and said clearance is different at said first and second seals for sharing said pressure loading.

6. A method according to claim 4 wherein said first and second seals have a common design except for a single design feature consisting of packing density of said bristle packs, and said packing density is different for said first and second seals for sharing said pressure loading.

7. A method of making a multistage seal comprising:

specifying initial first and second brush seals for collectively sealing a differential pressure along a land subject to relative rotation with said seals;

modifying said seals to share loading from said differential pressure without blowdown therefrom;

modifying said seals to ensure rotational stability with said land;

determining pressure blowdown of said seals under pressure; and using information obtained from determining pressure blowdown of said seals under pressure for modifying said seals to share said pressure loading under said blowdown.

8. A multistage seal made by the method of claim 7 having different configurations of said seals for substantially equally sharing said pressure loading with blowdown therefrom.

9. A method according to claim 7 wherein:

said first and second seals are initially specified each with a pack of bristles mounted axially between a forward plate and an aft plate, with distal ends of said bristles extending in free length therefrom; and said bristles are modified in free length and stiffness to minimize heat generation upon rubbing with said land to pressure said rotational stability with said land.

10. A method according to claim 9 wherein:

determining pressure blowdown comprises testing said seals to measure pressures, temperatures, and mass flows of fluid driven thereacross by said differential pressure; and said measured pressures, temperatures, and mass flows are analyzed to determine said blowdown for each of said seals.

11. A method according to claim 10 wherein said seals have a common design feature differently modified for sharing said pressure loading under said blowdown.

12. A method according to claim 11 wherein said common design feature is clearance between said bristle ends and said land, and said clearance is different at said first and second seals for sharing said pressure loading.

13. A method according to claim 11 wherein said common design feature is packing density of said bristle packs, and said packing density is different for said first and second seals for sharing said pressure loading.

14. A multistage seal made by the method of claim 10 having first and second seals with common designs except for different configurations of a single design feature for equally sharing said pressure loading under said blowdown.

15. A multistage seal according to claim 14 wherein said common design feature is clearance between said bristle ends and said land, and said clearance is different at said first and second seats for sharing said pressure loading.

16. A multistage seal according to claim 14 wherein said common design feature is packing density of said bristle packs, and said packing density is different for said first and second seals for sharing said pressure.

* * * * *